United States Patent
Kubota et al.

[11] Patent Number: 6,039,796
[45] Date of Patent: Mar. 21, 2000

[54] INK JET RECORDING INK AND METHOD

[75] Inventors: Kazuhide Kubota; Toshiyuki Miyabayashi, both of Nagano, Japan

[73] Assignee: Seiko Epson Corporation, Tokyo-To, Japan

[21] Appl. No.: 09/105,912

[22] Filed: Jun. 26, 1998

[30] Foreign Application Priority Data

Jun. 26, 1997 [JP] Japan .................................. 9-170203
Jun. 26, 1997 [JP] Japan .................................. 9-170204

[51] Int. Cl.$^7$ .................................................. C09D 11/00
[52] U.S. Cl. .................... 106/31.6; 106/31.65; 106/31.68
[58] Field of Search ............................... 106/31.6, 31.68, 106/31.65

[56] References Cited

U.S. PATENT DOCUMENTS

| | | | |
|---|---|---|---|
| 5,328,504 | 7/1994 | Ohnishi | 106/31.43 |
| 5,492,952 | 2/1996 | Tonogaki et al. | 106/31.43 |
| 5,667,572 | 9/1997 | Taniguchi et al. | 106/31.36 |
| 5,746,818 | 5/1998 | Yatake | 106/31.86 |

FOREIGN PATENT DOCUMENTS

| | | |
|---|---|---|
| 0412548 | 2/1991 | European Pat. Off. . |
| 0791473 | 8/1997 | European Pat. Off. . |
| 59-199780 | 11/1984 | Japan . |

*Primary Examiner*—Helene Klemanski
*Assistant Examiner*—Veronica F. Faison
*Attorney, Agent, or Firm*—Ladas & Parry

[57] ABSTRACT

A good ink composition for ink jet recording, especially an ink composition that can be stably ejected from a recording head and can yield an image possessing excellent rubbing/scratch resistance. An ink jet recording method comprising the step of printing two solutions of a first solution and an ink composition that, even in the case of printing on a recycled paper, can realize a good printed image, especially an image having no significant feathering and free from unevenness of printing and an image free from color bleeding. The ink composition comprises a combination of an inorganic oxide colloid with an alkali metal hydroxide.

25 Claims, 3 Drawing Sheets

INK JET RECORDING INK AND METHOD

BACKGROUND OF THE INVENTION

1. Field of the Invention

The present invention relates to an ink jet recording method, and more particularly to an ink jet recording method wherein a reaction solution and an ink composition are deposited onto a recording medium to conduct printing. The present invention also relates to an ink composition suitable for use in the ink jet recording method.

2. Background Art

Ink jet recording is a printing method wherein droplets of an ink composition are ejected and deposited onto a recording medium such as paper to conduct printing. This method has a feature that an image having high resolution and quality can be printed at a high speed by means of a relatively inexpensive apparatus. In general, the ink composition used in the ink jet recording comprises water as a main component and, added thereto, a colorant and a wetting agent, such as glycerin, for preventing clogging.

Inks used in the ink jet recording are required to have properties including that the ink does not undergo any change in properties during storage, does not clog nozzle holes of the print head, does not yield an unacceptable image due to color-to-color intermixing (hereinafter referred to as "color bleeding") in an area where inks of different colors are superimposed on top of each other or one another, can yield a high-density image, and can yield an image possessing rubbing/scratch resistance, lightfastness, and waterfastness. Although water-soluble dyes have been mainly used as colorants for the ink in the above methods, utilization of inks using pigments has been proposed from the viewpoint of improving the lightfastness and the waterfastness of the printed image.

The image yielded by the ink composition using a pigment certainly possess excellent waterfastness. Since, however, the pigment is generally insoluble in water, it is necessary to stably disperse pigment particles in the ink composition. When the state of dispersion of the pigment in the ink composition is unstable, precipitates and the like are likely to be created, often clogging nozzles of the ink jet printing head. An additional problem associated with the ink composition using a pigment is that the ink composition using a pigment is inferior to that using a dye in rubbing/scratch resistance of the printed image because the pigment is basically present as particles on the recording medium. In order to solve the problems involved in the ink composition using a pigment, the addition of an inorganic oxide colloid, such as colloidal silica, to the ink composition has been proposed in the art (for example, Japanese Patent Laid-Open No. 199780/1984).

Regarding the ink jet recording method, the application of a polyvalent metallic salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer an image having waterfastness and high quality free from color bleeding.

Further, the use of a color ink comprising at least a surfactant for imparting a penetrating property or a solvent having a penetrating property and a salt in combination with a black ink capable of being thickened or agglomerated through the action of the salt has been proposed to yield a high-quality color image having a high image density and free from color bleeding (Japanese Patent Laid-Open No. 106735/1994). Specifically, an ink jet recording method has been proposed wherein two liquids, a first solution containing a salt and a second solution of an ink composition are printed to yield a good image.

Ink jet recording methods using two liquids are disclosed also in, for example, Japanese Patent Laid-Open Nos. 240557/1991 and 240558/1991.

In the above ink jet recording methods wherein two liquids are printed, a further improvement in the following properties has been desired in the art.

At the outset, an improvement in fixability of the colorant is required. In recent years, recycled papers have become used instead of wood free papers. In many cases, for the recycled papers, the penetration of an ink is better than that for the wood free papers. For this reason, a high-quality image is formed on the wood free papers, whereas feathering or color bleeding is often created in the image formed on the recycled papers, so that, for recycled paper, the elimination of the feathering or color bleeding has been desired in the art.

Secondly, a reduction in uneven printing is required. The uneven printing refers to a variation in color density in the print derived from localization of a colorant on the paper. Although the uneven printing poses no significant problem in printing of letters of regular size, it is a serious problem in applications where figures, graphs and the like are printed.

Thirdly, broadening the range of usable colorants is required. Most of ink jet recording methods where two liquids are printed utilize a salting-out phenomenon between a metal ion and a carboxyl ion contained in the colorant. Therefore, the colorant should have a carboxyl group. Some dyes, however, contain a group other than the carboxyl group, for example, a group which has been water-solubilized by the action of a sulfonic group. A recording method which permits the utilization of such dyes has been desired in the art.

SUMMARY OF THE INVENTION

We have now found that addition of an alkali metal hydroxide to an ink composition containing an inorganic oxide colloid, such as colloidal silica, can provide an ink composition that can satisfy on a high level various properties required of the ink composition for ink jet recording, especially an ink composition that can be stably ejected from a recording head and can realize an image possessing excellent rubbing/scratch resistance.

We have further found that this ink composition can realize a good image in an ink jet recording method wherein two liquids are printed. The present invention has been made based on such novel finding.

Accordingly, an object of the present invention is to provide a good ink composition for ink jet recording, especially an ink composition that can be stably ejected from a recording head and can realize an image possessing excellent rubbing/scratch resistance.

According to one aspect of the present invention, there is provided an ink composition for ink jet recording, comprising at least a pigment, an inorganic oxide colloid, an alkali metal hydroxide, and an aqueous solvent.

Another object of the present invention is to provide an ink jet recording method involving printing of two liquids that can realize a good image.

A more specific object of the present invention is to provide an ink jet recording method involving printing of two liquids that can realize a good image even on recycled paper.

A further object of the present invention is to provide an ink jet recording method involving printing of two liquids that is free from uneven printing and can realize an even image.

A still further object of the present invention is to provide an ink jet recording method involving printing of two liquids wherein a wide variety of colorant components are usable.

According to another aspect of the present invention, there is provided an ink jet recording method, comprising the step of depositing a reaction solution and an ink composition onto a recording medium to perform printing, the reaction solution comprising a polyvalent metal salt, polyallylamine, or a derivative of the polyallylamine, the ink composition comprising at least a colorant, an inorganic oxide colloid, and an aqueous solvent and having a pH value of not less than 9.

DETAILED DESCRIPTION OF THE INVENTION

Ink composition

Figure 1:
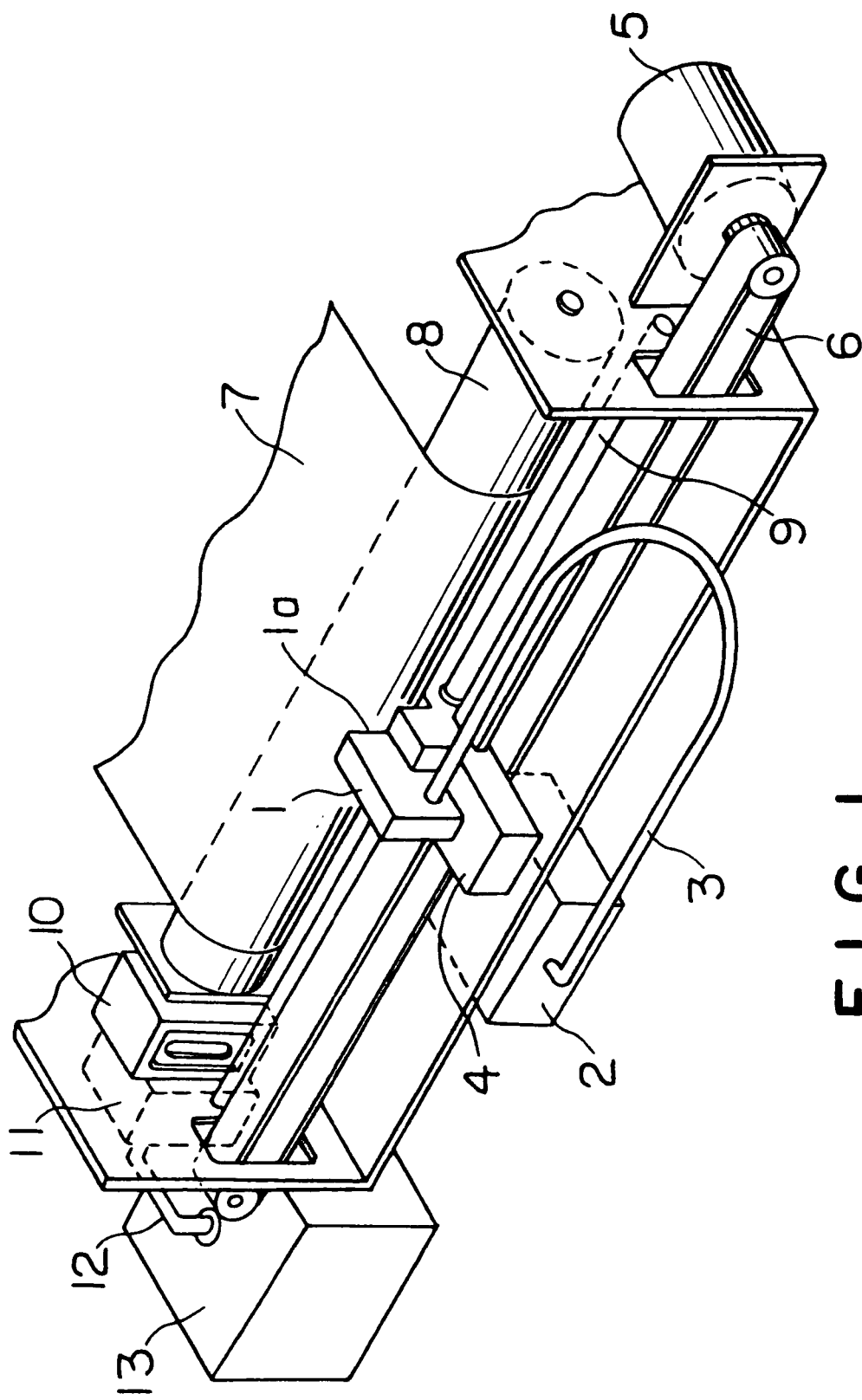
FIG. 1 is a diagram showing an ink jet recording apparatus usable in practicing the method according to the present invention, wherein a recording head is provided separately from an ink tank, and an ink composition and a reaction solution are fed into the recording head through an ink tube.

The ink composition according to the present invention comprises at least a colorant, an inorganic oxide colloid, an alkali metal hydroxide, and an aqueous solvent. The ink composition according to the present invention can be stably ejected from a recording head and can realize an image possessing excellent rubbing/scratch resistance.

Pigment

The colorant contained in the ink composition of the present invention is a pigment. Inorganic pigments or organic pigments may be used without any particular limitation. Inorganic pigments usable herein include, in addition to titanium oxide and iron oxide, carbon blacks produced by known processes, such as contact, furnace, and thermal processes. Examples of the organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added, to the ink, in the form of a pigment dispersion prepared by dispersing the pigment in an aqueous medium with the aid of a dispersant. Preferred dispersants include those commonly used in the preparation of a dispersion of a pigment, for example, polymeric dispersants and surfactants.

The amount of the pigment added to the ink composition is preferably about 0.5 to 25% by weight, more preferably about 2 to 15% by weight.

Inorganic oxide colloid

The inorganic oxide colloid (also called "inorganic oxide sol") used in the present invention refers to a colloidal solution comprising: a dispersion medium composed of water or water and an organic solvent having good compatibility with water; and a dispersoid composed of ultrafine particles of an inorganic oxide. Inorganic oxides usable herein include, but are not limited to, high-molecular weight silicic anhydride ($SiO_2$) and alumina ($Al_2O_3$). The particle diameter of the ultrafine particles of the inorganic oxide is generally about 1 to 100 nm, preferably 1 to 20 nm, more preferably 1 to 10 nm. The dispersion medium for the inorganic oxide colloid is generally water or a mixed solvent composed of water and an organic solvent having good compatibility with water, for example, methanol, ethanol, isopropyl alcohol, or n-propanol. The inorganic oxide colloid is prepared by dispersing ultrafine particles of the inorganic oxide into water or the above organic solvent. A dispersion of the ultrafine particles of the inorganic oxide in water is called an "aqueous sol," and a dispersion of the ultrafine particles of the inorganic oxide in an organic solvent is called an "organosol."

The function of the inorganic oxide colloid used in the present invention is considered to be such that the inorganic oxide colloid, when it exists in the ink composition, promotes stable dispersion of the pigment in the ink composition and, upon the formation of an image on the recording medium, permits the pigment particles to be strongly deposited into the recording medium, improving the rubbing/scratch resistance of the printed image.

The inorganic oxide colloid may be a commercially available one, and specific examples thereof include: Snowtex S, Snowtex N, Snowtex C, Snowtex SS, Snowtex XS, Snowtex 20, Snowtex 30, and Snowtex 40, manufactured by Nissan Chemical Industry Ltd., Cataloid SI-350, Cataloid SI-500, Cataloid SI-30, Cataloid S-20L, Cataloid S-20H, Cataloid S-30L, Cataloid S-30H, and Cataloid SI-40, manufactured by E. I. du Pont de Nemours & Co.), which are dispersions of ultrafine particles of high-molecular weight silicic anhydride in water; Aluminasol 100, Aluminasol 200, and Aluminasol 520, manufactured by Nissan Chemical Industry Ltd., which are dispersions of ultrafine particles of alumina in water; and OSCAL-1432 (isopropyl alcohol sol, manufactured by Catalysts and Chemicals Industries Co., Ltd.) which is a dispersion of ultrafine particles of high-molecular weight silicic anhydride in an organic solvent, Most of the commercially available colloidal solutions of inorganic oxides have pH adjusted to the acidic or alkaline. This is because the pH region where the inorganic oxide colloid exists stably in the dispersed state is on the acidic or alkaline side. Therefore, when the addition of a commercially available inorganic oxide colloidal solution to the ink is contemplated, it should be made by taking into consideration the pH region, where the inorganic oxide colloid exists stably in the dispersed state, and the pH value of the ink.

The amount of the inorganic oxide colloid added may be suitably determined by taking into consideration the type and the effect attained by the addition of the inorganic oxide colloid. In general, however, for example, it is preferably about 0.1 to 15% by weight, more preferably about 0.5 to 5.0% by weight, based on the ink composition. A plurality of inorganic oxide colloids may be added.

Alkali metal hydroxide

The alkali metal hydroxide used in the present invention refers to a hydroxide of lithium, sodium, potassium, rubidium, caesium, or francium with potassium hydroxide being preferred.

The addition of the alkali metal hydroxide enables the ink composition to be more stably ejected from the recording head and at the same time can yield an image having improved waterfastness.

The amount of the alkali metal hydroxide added may be suitably determined by taking into consideration the type and the effect attained by the addition of the alkali metal hydroxide. In general, however, for example, the amount is preferably about 0.01 to 1% by weight, more preferably about 0.01 to 0.2% by weight, based on the ink composition. A plurality of alkali metal hydroxides may be added.

Aqueous solvent

The aqueous solvent as the base solvent for the ink composition according to the present invention comprises an aqueous organic solvent and water.

The aqueous organic solvent is preferably a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

According to a preferred embodiment of the present invention, the aqueous solvent may further comprise a wetting agent comprising a high-boiling organic solvent. Preferred examples of high-boiling organic solvents usable herein include: polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

The amount of the wetting agent added is preferably 0.5 to 40% by weight, more preferably 2 to 20% by weight. The amount of the low-boiling organic solvent added is preferably 0.5 to 10% by weight based on the ink, more preferably 1.5 to 6% by weight.

The ink composition of the present invention may further comprise a penetrating agent. Penetrating agents usable herein include surfactants such as anionic, cationic, and amphoteric surf actants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

If necessary, pH adjustors, preservatives, antimolds and the like may be added to the ink composition of the present invention. pH adjustors usable herein include triethanolamine. The alkali metal hydroxide, which is an indispensable component of the ink composition according to the present invention, is basic and hence may be used also as the pH adjustor.

Saccharide

According to a preferred embodiment of the present invention, the ink composition of the present invention comprises a saccharide. The addition of the saccharide can further improve the color density, minimizing feathering and uneven printing. Further, in the case of a color image, color bleeding can be prevented on a high level. Specific examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

Resin emulsion

According to a preferred embodiment of the present invention, the ink composition of the present invention comprises a resin emulsion. Resin components usable in the resin emulsion include acrylic resin, vinyl acetate resin, styrene/butadiene resin, vinyl chloride resin, (meth)acrylate/styrene resin, butadiene resin, and styrene resin.

Commercially available resin emulsions usable herein may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by adding a surfactant and water to a polymer, prepared by polymerization, to emulsify the polymer, or by emulsion polymerization of a monomer in the presence of a surfactant in water. For example, an acrylic resin emulsion or a styrene/acrylic resin emulsion may be prepared by subjecting an ester of (meth) acrylic acid or alternatively an ester of (meth)acrylic acid in combination with styrene to emulsion polymerization in the presence of an emulsifier, such as a surfactant. In general, the mixing ratio of the resin component to the surfactant is preferably about 10:1 to 5:1. When the amount of the CE surfactant used falls within the above range, it is possible to provide an ink which has good waterfastness in the form of an image and good penetrability. The surfactant is not particularly limited. Preferred examples thereof include anionic surfactants (for example, alkylsulfates, alkylallylsulfonates, dialkyl succinates, and alkylnaphthalenesulfonates); and nonionic surfactants having an HLB value of not less than 10 (for example, polyoxyethylene alkyl ethers, polyoxyethylene alkylallyl ethers). They may be used alone or as a mixture of two or more.

The ratio of the resin as the component constituting the dispersed phase to water is such that the amount of water is suitably 60 to 400 parts by weight, preferably 100 to 200 parts by weight, based on 100 parts by weight of the resin.

In the ink composition used in the present invention, the amount of the resin emulsion incorporated therein is preferably such that the amount of the resin component is in the range of from 0.1 to 40% by weight, more preferably in the range of from 1 to 25% by weight, based on the ink composition.

Ink jet recording method using two liquids

The ink jet recording method according to the present invention comprises the step of printing a reaction solution and an ink composition on a recording medium.

The reaction solution and the ink composition may be applied on a recording medium in any sequence. Specifically, any of the following methods may be suitably used: a method wherein a reaction solution is deposited onto a recording medium followed by deposition of an ink composition onto the recording medium with the reaction solution deposited thereon, a method wherein an ink composition is printed followed by deposition of the reaction solution, and a method wherein a reaction solution and an ink composition are mixed together immediately before or immediately after ejection thereof.

According to the ink jet recording method of the present invention, good printing can be realized by bringing a reaction solution into contact with an ink composition. Although the present invention is not intended to be bound by the following hypothesis, the reason why good printing can be achieved by the present invention is believed as follows. Upon contact of the reaction solution with the ink composition, the polyvalent metal ion, polyallylamine, or derivative of polyallylamine contained in the reaction solution breaks the state of dispersion of a colorant, an inorganic oxide colloid, and other ingredients contained in the ink composition, resulting in agglomeration of these ingredients. Especially, the polyvalent metal ion, polyallylamine, or derivative of polyallylamine contained in the reaction solution is reacted with the inorganic oxide colloid contained in the ink composition to form agglomerates which inhibit the penetration of the colorant into the recording medium. It is considered that colloidal particles left on the recording medium are deposited onto the recording medium, and the particles are bound to one another to form a film, accelerating the fixation of the colorant onto the recording medium. Thus, an image having high color density and free from feathering and uneven printing could be realized. Further, in a color image, uneven color mixing in boundaries of different colors, that is, color bleeding, can also be advantageously prevented. The above mechanism is hypothetical, and the present invention should not be construed to be limited by this mechanism.

Further, in the present invention, it is considered that the inorganic oxide colloid is reacted with the polyvalent metal ion, polyallylamine, or derivative of polyallylamine contained in the reaction solution to efficiently form agglomerates, enabling a good printed image to be realized even when the colorant, together with the polyvalent metal ion, polyallylamine, or derivative of polyallylamine, is less likely to form an agglomerate. This means that the method according to the present invention does not limit the kind of the colorant used and permits a wide variety of colorants to be used, which is a great advantage of the present invention.

The deposition of the reaction solution onto the recording medium may be carried out by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

As described below, the reaction solution may contain a colorant so as to function also as an ink composition.

Ink composition

The above-described ink composition can be basically used as the ink composition for the ink jet recording method according to the present invention. As described below, however, in the ink composition used in the present invention, the colorant is not limited to the pigment, and the pH value is not less than 9 which is different from the pH value in the above-described ink composition. Specifically, the ink composition used in the ink jet recording method according to the present invention comprises at least a colorant, an inorganic oxide colloid, and an aqueous solvent and has a pH value of not less than 9.

Inorganic oxide colloid

The inorganic oxide colloid may be the same as that used in the above ink composition according to the present invention.

The amount of the inorganic oxide colloid added may be suitably determined by taking into consideration the type and agglomerate thereof. For example, the amount is preferably about 0.1 to 15% by weight, more preferably about 0.5 to 5.0% by weight, based on the ink composition. A plurality of inorganic oxide colloids may be added.

pH of ink composition

The ink composition used in the present invention should have a pH value of not less than 9. The lower limit of the pH value is preferably 10, and the upper limit of the pH value is preferably 11.5. When the pH value of the ink composition is in the above range, the ink composition can yield a good image.

The pH value of the ink composition may be adjusted using any of an organic base and an inorganic base. Examples of preferred organic bases include triethanolamine, diethanolamine, monoethanolamine, dimethylethanolamine, diethylethanolamine, and morpholine. Examples of preferred inorganic bases include alkali metal hydroxides, for example, hydroxides of lithium, sodium, potassium, rubidium, caesium, and francium. Among them, potassium hydroxide is preferred. The addition of the alkali metal hydroxide, as compared with the organic base and the inorganic base, is preferred from the viewpoint of producing a good image. Although the reason for this has not been fully elucidated yet, the reactivity of a polyvalent metal salt, polyallylamine, a derivative of polyallylamine with the inorganic oxide colloid is improved, realizing a good image.

The amount of the alkali metal hydroxide added may be suitably determined so as to realize the above pH, for example, preferably about 0.01 to 1% by weight, more preferably about 0.01 to 0.2% by weight, based on the ink composition, from the viewpoint of yielding a good image. A plurality of the alkali metal hydroxides may be added.

Colorant

The colorant contained in the ink composition used in the present invention may be any of dyes and pigments. As described above, in the present invention, a very wide variety of colorants may be utilized.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Pigments usable herein include those described above in connection with the ink composition according to the present invention.

The amount of the pigment added to the ink composition is preferably about 0.5 to 25% by weight, more preferably about 2 to 15% by weight.

Aqueous solvent

The aqueous solvent as the basic solvent for the ink composition used in the ink jet recording method according to the present invention may be the same as described above in connection with the ink composition according to the present invention.

As with the ink composition of the present invention, the ink composition used in the ink jet recording method according to the present invention may optionally contain pH adjustors, preservatives, antimolds and the like.

Saccharide

The saccharide contained in the ink composition used in the ink jet recording method according to the present invention may be the same as described above in connection with the ink composition of the present invention.

The saccharide content is suitably 0.1 to 40% by weight, preferably 0.5 to 30% by weight, based on the ink composition.

Epoxy-containing compound and epoxy curing agent

According to a preferred embodiment of the present invention, preferably, the ink composition used in the present invention contains an epoxy-containing compound. The term "epoxy-containing compound" used herein means a compound which has at least two epoxy groups in its molecular structure and causes a crosslinking reaction, in which an epoxy group is involved, resulting in resinification (i.e., increased molecular weight). The addition of the epoxy-containing compound permits good rubbing/scratch resistance and waterfastness to be imparted to the printed image.

Epoxy-containing compounds usable in the present invention include compounds containing an epoxy group and, in addition, a functional group reactive with an epoxy group and compounds containing an epoxy group but not containing a functional group reactive with an epoxy group.

The term "functional group reactive with an epoxy group" used herein means a functional group which is reacted with an epoxy group to cause crosslinking, and examples of such functional groups include hydroxyl, carboxyl, and sulfonic groups. In the present invention, the use of the epoxy-containing compound having a functional group reactive with an epoxy group can eliminate the need to add an epoxy curing agent, described below, to the reaction solution. On the other hand, the addition of an epoxy curing agent to the reaction solution in combination with the use of the epoxy-containing compound having a functional group reactive with an epoxy group results in further improved fixation rate of the print. Any one of these advantages may be selected depending upon situation.

The mechanism through which the addition of an epoxy-containing compound to the ink composition in the present invention can offer a good print is believed as follows. However, the following mechanism is hypothetical, and the Li present invention should not be construed to be limited by this mechanism.

In the method according to the present invention, the reaction solution and the ink composition are deposited onto a recording medium. Upon the deposition of the ink composition onto the recording medium, interaction between a polyvalent metal ion derived from a polyvalent metal salt, polyallylamine, or a derivative of polyallylamine in the reaction solution and an inorganic oxide colloid in the ink composition results in agglomeration. In this case, when the reaction solution contains an epoxy-curing agent, crosslinking of the epoxy group in the epoxy-containing compound occurs, resulting in resinification. On the other hand, it is considered that when the compound having a functional group reactive with an epoxy group is used as the epoxy-containing compound, the resinification proceeds through the following mechanism despite the absence of an epoxy-curing agent. Specifically, when the distance between the epoxy-containing compounds is decreased by the agglomeration due to the interaction between the polyvalent meal salt, polyallylamine, or a derivative of polyallylamine in the reaction solution and the inorganic oxide colloid in the ink composition, a reaction of the epoxy group with the functional group reactive with the epoxy group would occur among adjacent epoxy-containing compounds. This reaction is considered to cause crosslinking among the epoxy-containing compounds, resulting in resinification. The resinification permits a printed image to be strongly fixed to the recording medium and, in addition, results in the formation of a resin film on the surface of the printed image. Such a print is considered to have good scratch/rubbing resistance, waterfastness, and lightfastness.

In this connection, it should be noted that a reaction between the epoxy-containing compounds each having a functional group reactive with an epoxy group in the ink composition is apparently unfavorable. Therefore, preferably, utilization of such epoxy-containing compounds is avoided.

Epoxy-containing compounds which may be preferably used in the present invention include epoxy-containing resin emulsions and water-soluble epoxy compounds.

According to a preferred embodiment of the present invention, epoxy-containing resin emulsions include an epoxy-containing acrylic resin emulsion comprising: a continuous phase of water; and a dispersed phase comprising a copolymer comprised of repeating units represented by the following formulae (I) and (II):

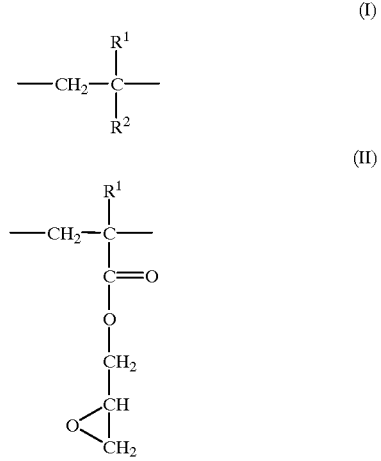

wherein $R^1$ and $R^3$ each independently represent H or $CH_3$;

$R^2$ represents a group containing in its structure at least one group selected from alkyl (with $C_{1-21}$ alkyl being preferred), hydroxyl, carboxyl and sulfonic groups. This resin is not limited by the form of copolymers, and, for example, a block copolymer and a random copolymer are possible.

For the above copolymers, the terminal thereof has no essential influence on the properties because the copolymers are polymeric. In general, a fragment of a polymerization initiator constitutes the terminal, and examples of such fragments of the polymerization initiator include fragments of ammonium persulfate and potassium persulfate, such as —$OSO_3H$.

Examples of preferred $R^2$ include —OH, —COOH, or —COO—R (wherein R represents a straight or branched alkyl group, preferably a $C_{1-12}$ alkyl group with at least one hydrogen atom on the alkyl group being optionally substituted by a hydroxyl, phosphono, or sulfonic group), and an aryl group substituted by a sulfonic group (for example, a phenyl or tolyl group). Specific examples of the group represented by $R^2$ include —OH, —COOH, —$COOCH_2CH_2OH$, —$COOCH_2CH(CH_3)OH$, —$COOCH_2CH_2PO(OH)_2$, —$C_6H_5SO_3H$, —$COOCH_2CH_2SO_3H$, —$COOCH_3$, —$COOC_2H_5$, —$COOC_4H_9$, —$COOC_6H_{13}$, —$COO(CH_2)_{11}CH$, and —$COOCH_2CH(CH_3)CH_2C(CH_3)_3$. In this case, a hydroxyl, carboxyl, or sulfonic group which may be contained in $R^2$ is a functional group reactive with an epoxy group. Therefore, when $R^2$ contains an alkyl group alone and when $R^2$ contains a hydroxyl, carboxyl, or sulfonic group but does not substantially react with an epoxy group, the resin emulsion does not have any functional group reactive with an epoxy group. On the other hand, when $R^2$ contains a hydroxyl, carboxyl, or sulfonic group in addition to an alkyl group, the resin emulsion has a functional group reactive with an epoxy group.

Commercially available resin emulsions may be used, CZ and examples thereof include Almatex Z116 (manufactured by Mitsui Toatsu Chemicals, Inc.), NEW COAT S-2170 and NEW COAT S-1080 (manufactured by Shin-Nakamura Chemical Co., Ltd.), VANATEX #952 and VANATEX HG-9 (manufactured by Shin-Nakamura Chemical Co., Ltd.), and Piestex B-3 (manufactured by Shin-Nakamura Chemical Co., Ltd.).

Preferably, the water-soluble epoxy compound comprises at least two, per molecule, epoxy groups reactive with an epoxy-curing agent described below, and typical examples thereof include water-soluble diepoxides. Water-soluble epoxy compounds which may be preferably used in the present invention include compounds represented by the following formula.

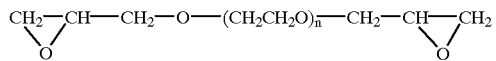

wherein n is a natural number of 4 to 9.

Examples of preferred water-soluble epoxy compounds include polyethylene glycol glycidyl ether. Commercially available water-soluble epoxy compounds usable herein include Epolight 400E (polyethylene glycol #400 glycidyl ether, manufactured by Kyoeisha Chemical Co., Ltd.), Epolight 200E (polyethylene glycol #200 glycidyl ether, manufactured by Kyoeisha Chemical Co., Ltd.), Epolight 80MF (glycerin diglycidyl ether, manufactured by Kyoeisha Chemical Co., Ltd.), Epiall G-100 (glycerin diglycidyl ether, manufactured by Nippon Oils & Fats Co., Ltd.), and Denacol (manufactured by Nagase Chemicals Ltd.).

Examples of epoxy-containing compounds, having a functional group reactive with an epoxy group, which may be preferably used in the present invention include those, among the above epoxy-containing resin emulsions, wherein at least part of $R^2$ contains a functional group reactive with an epoxy group, that is, a functional group selected from hydroxyl, carboxyl, and sulfonic groups. It is also possible to use an epoxy-containing compound wherein $R^2$ partly contains an alkyl group, preferably a $C_{1-21}$ alkyl, and does not contain any functional group reactive with an epoxy group. Commercially available epoxy-containing compounds of the above type include Almatex Z116 (manufactured by Mitsui Toatsu Chemicals, Inc.).

The content of the epoxy-containing compound in the ink composition according to the present invention is preferably about 1 to 10% by weight, more preferably 1 to 5% by weight, based on the ink composition.

The ink composition used in the present invention may contain a resin emulsion as described below. When the above epoxy-containing compound is an epoxy-containing resin emulsion, it serves also as the resin emulsion. Therefore, use of an additional resin emulsion is unnecessary. However, according to a preferred embodiment of the present invention, the resin emulsion is added in combination with the epoxy-containing resin emulsion.

In the present invention, preferably, an epoxy-curing agent may be incorporated into the reaction solution. This epoxy-curing agent refers to an agent which, together with the epoxy-containing compound contained in the ink composition, accelerates resinification (an increase in molecular weight) of the epoxy-containing compound by crosslinking. According to the present invention, any epoxy-curing agent may be utilized without any limitation so far as it can offer a printed image having good rubbing/scratch resistance and waterfastness in the ink jet recording method described below.

Epoxy-curing agents which may be preferably used in the present invention are typically soluble in water. Examples thereof include amine compounds, for example, ethylenediamine, diethylaminopropylamine, N-aminoethylpiperazine, trimethylhexamethylenediamine, modified aliphatic amines, water-soluble polyamines, water-soluble cold curing catalysts other than amines, for example, aromatic sulfonic acid, such as p-phenolsulfonic acid, and curing agents for epoxy emulsions. It is also possible to utilize commercially available curing agents, and examples thereof include Almatex H700 (manufactured by Mitsui Toatsu Chemicals, Inc.) and EPOKY-H (manufactured by Mitsui Toatsu Chemicals, Inc.).

The concentration of the epoxy-curing agent in the reaction solution is preferably about 0.1 to 40% by weight, more preferably about 1 to 20% by weight.

According to the present invention, upon printing of an ink composition on a recording medium with a reaction solution deposited thereon, an epoxy-curing agent contained in the reaction solution is reacted with an epoxy-containing compound contained in the ink composition, to permit crosslinking of the epoxy-containing compound to proceed. This reaction may be expressed, for example, by the following formula:

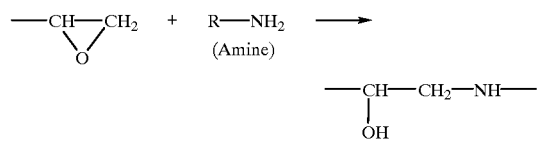

This accelerates the resinification of the epoxy-containing compound (a further increase in molecular weight of the resin emulsion). The above resinification in a printed image formed on a recording medium permits the printed image to be strongly adhered to the recording medium and, in addition, results in the formation of a resin film on the surface of the printed image. Thus, the print has good rubbing/scratch resistance, waterfastness, and lightfastness.

Resin emulsion

According to a preferred embodiment of the present invention, the ink composition used in the present invention contains a resin emulsion. Preferred resin At emulsions include those described above in connection with the ink composition of the present invention.

The amount of the resin emulsion contained in the ink composition used in the present invention is such that the amount of the resin component is 0.1 to 40% by weight, more preferably 1 to 25% by weight, based on the ink composition.

It is considered that both the resin emulsion containing an epoxy group and the resin emulsion not containing an epoxy group, by virtue of interaction with the polyvalent metal ion, polyallylamine, or a derivative of polyallylamine, has the effect of inhibiting the penetration of the colorant component and accelerating the fixation of the colorant onto the recording medium.

Reaction solution

The reaction solution used in the present invention basically comprises a polyvalent metal salt, polyallylamine, or a derivative of polyallylamine, and water. When the ink composition contains an epoxy-containing compound, preferably, the reaction solution further comprises the above-described epoxy-curing agent.

According to the present invention, the polyvalent metal salt contained in the reaction solution may comprise a divalent or higher polyvalent metal ion and an ion bonded to the polyvalent metal ion, preferably a nitrate ion or a carboxylate ion and is soluble in water.

In this case, preferably, the carboxylate ions are derived from a carboxylic acid selected from the group consisting of a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, and trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

Especially, a metal salt constituted by the above anion and $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing a good print quality and preventing clogging. It, however, is preferably about 0.1 to 40% by weight, more preferably about 5 to 25% by weight.

The polyallylamine and polyallylamine derivative usable in the reaction solution are cationic polymers which are soluble in water and can be positively charged in water. Such polymers include, for example, those represented by the following formulae (a), (b), and (c):

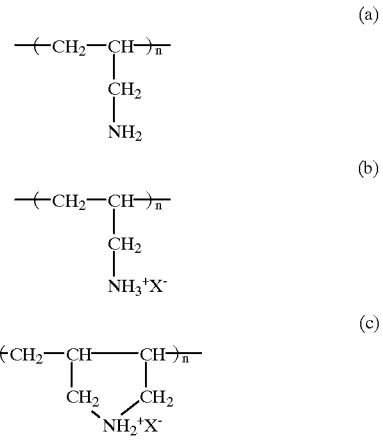

wherein $X^-$ represents chloride, bromide, iodide, nitrate, phosphate, sulfate, acetate or other ion.

In addition, a copolymer of an allylamine with a diallylamine and a copolymer of diallylmethylammonium chloride with sulfur dioxide may also be used.

The content of the polyallylamine and the polyallylamine derivative is preferably 0.5 to 10% by weight based on the reaction solution.

Further, in the present invention, preferably, the reaction solution comprises a wetting agent, such as a high-boiling organic solvent. Preferred examples of high-boiling organic solvents usable herein include those described above in connection with the ink composition. The high-boiling organic solvent functions to prevent the reaction solution from drying out, thereby preventing clogging of the head.

Although the amount of the high-boiling organic solvent added is not particularly limited, it is preferably about 0.5 to 40% by weight, more preferably about 2 to 20% by weight.

According to a more preferred embodiment of the present invention, addition of triethylene glycol monobutyl ether or glycerin as the high-boiling organic solvent is preferred. When triethylene glycol monobutyl ether and glycerin are added in combination, the amounts of triethylene glycol monobutyl ether and glycerin added are preferably about 10 to 20% by weight and about 1 to 15% by weight, respectively.

The reaction solution may be colored by adding a color colorant so that the reaction solution can function also as an ink composition.

In addition, if necessary, pH adjustors, preservatives, antimolds and the like may be added to the reaction solution from the viewpoint of improving the storage stability.

pH adjustors usable herein include triethanolamine. When the triethanolamine is added, the amount thereof is preferably about 0 to 2.0% by weight. In this connection, it should be noted that the alkali metal hydroxide which may be added to the ink composition used in the present invention is basic and hence can serve also as the pH adjustor.

Ink jet recording method and apparatus

The ink jet recording method according to the present invention and an ink jet recording apparatus for carrying out the ink jet recording method will be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is loaded into a carriage 4 and moved, with the head being guided by a guide 9, by means of a timing belt 6 driven by a motor 5. On the other hand, paper 7 as a recording medium is placed by a platen 8 at a position facing the recording head 1. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 2:
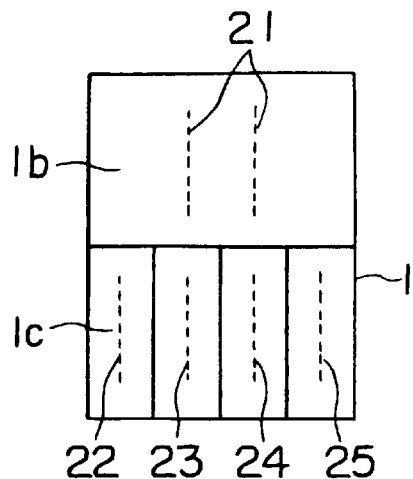
FIG. 2 is an enlarged view of the surface of nozzles for a recording head, wherein reference character 1b designates the surface of a nozzle for a reaction solution and reference character 1c the surface of a nozzle for an ink composition.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
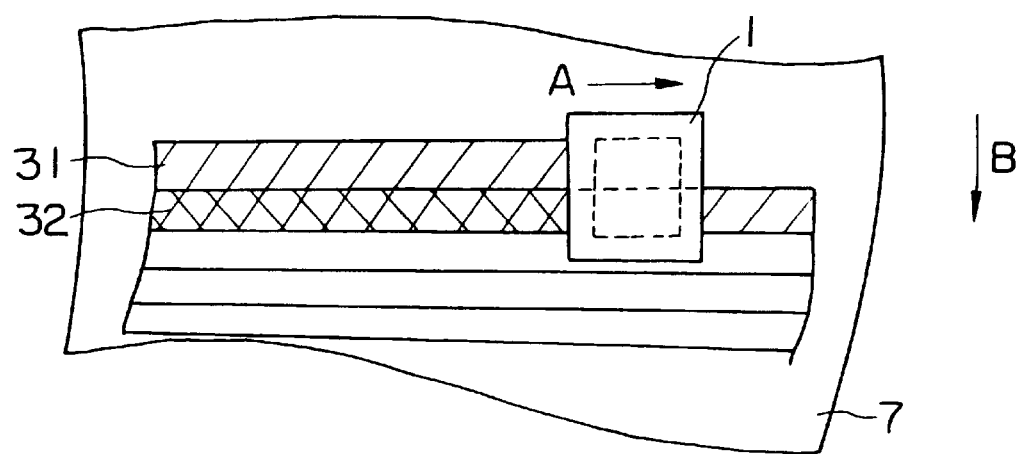
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the paper feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Figure 4:
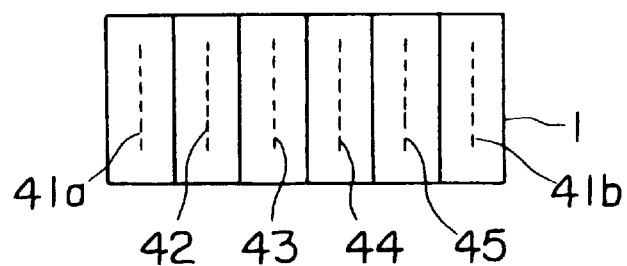
FIG. 4 is a diagram showing another embodiment of the recording head, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

In the ink jet recording apparatus, the supplement of the ink composition may be carried out by replacing an ink tank in a cartridge form. The ink tank may be integral with the recording head.

Figure 5:
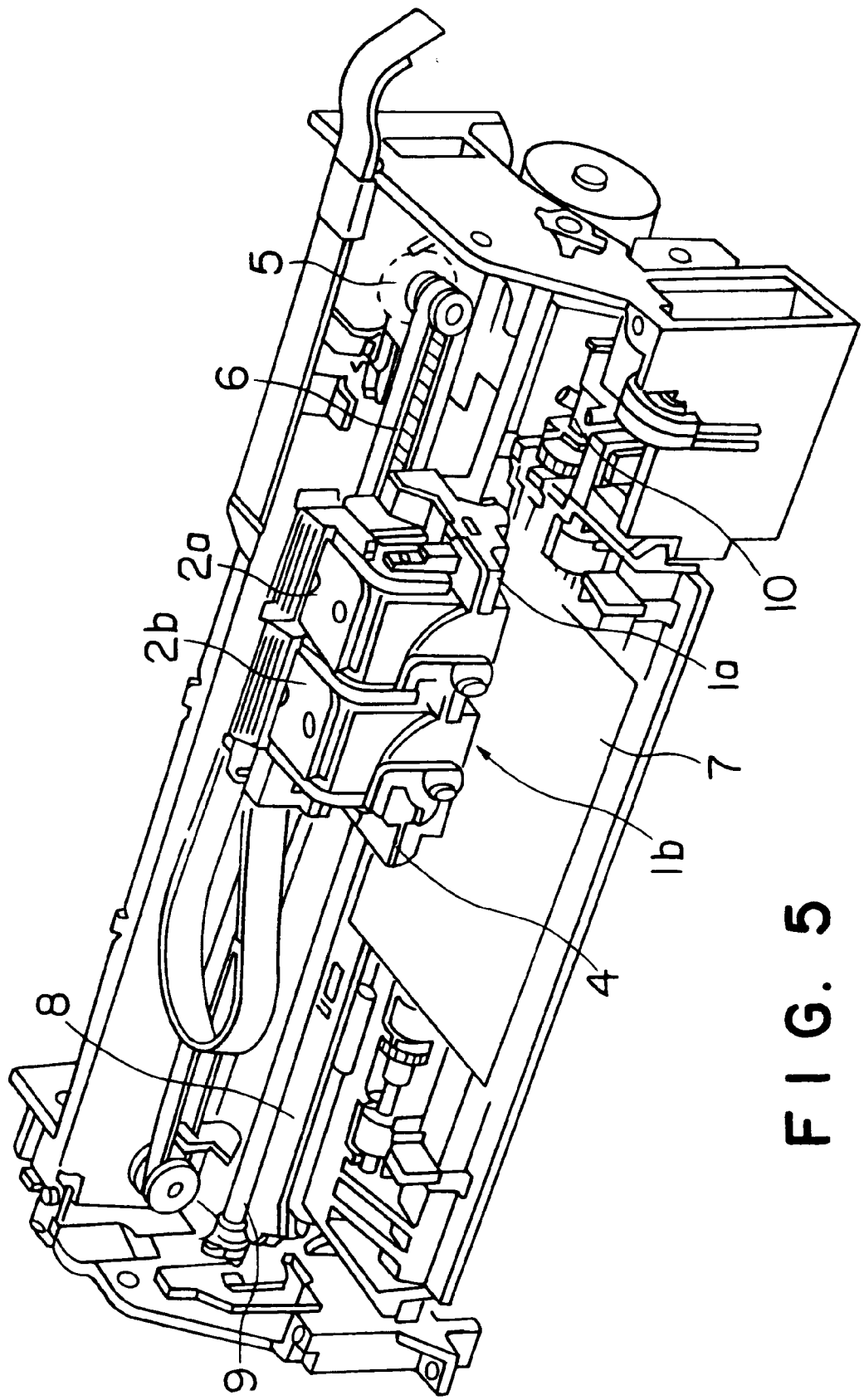
FIG. 5 is a diagram showing an ink jet recording apparatus usable in practicing the method according to the present invention, wherein a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1b is moved together with the ink tank 2b on the carriage 4.

EXAMPLES

Although the present invention will be described in more detail with reference to the following examples, it is not limited to these examples only.

Example A

Preparation of ink composition
The following ink compositions were prepared.
Example

| | |
|---|---|
| Carbon black MA7 (manufactured by Mitsubishi Chemical Corp.) | 5 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex S (colloidal silica, $SiO_2$ content 30%, manufactured by Nissan Chemical Industry Ltd.) | 2 wt % |
| Sucrose | 0.7 wt % |
| Maltitol | 6.3 wt % |
| Glycerin | 10 wt % |

Example A-continued

Preparation of ink composition
The following ink compositions were prepared.
Example

| | |
|---|---|
| KOH | 0.1 wt % |
| Ion-exchanged water | Balance |
| pH = 8.8 | |

The carbon black and the dispersant were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, the other ingredients were added, and the mixture was stirred at room temperature for 20 min. The mixture was filtered through a 5 μm membrane filter to prepare an ink jet recording ink.

The following ink compositions of Comparative Examples 1 and 2 were prepared as described above in connection with the ink composition of the example of the present invention.

| Comparative Example A1 | |
|---|---|
| Carbon black Raven 1080 (manufactured by Columbian Carbon Co., Ltd.) | 5 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex C (coloidal silica, SiO$_2$ content 20%, manufactured by Nissan Chemical Industry Ltd.) | 2 wt % |
| Sucrose | 0.7 wt % |
| Maltitol | 6.3 wt % |
| Glycerin | 10 wt % |
| Triethanolamine | 0.9 wt % |
| Ion-exchanged water | Balance |
| pH = 9.8 | |
| Comparative Example A2 | |
| Carbon black Raven 1080 (manufactured by Columbian Carbon Co., Ltd.) | 5 wt % |
| Styrene/acrylic acid copolymer (dispersant) | 1 wt % |
| Maltitol | 5 wt % |
| Glycerin | 10 wt % |
| Ion-exchanged water | Balance | pH=7.7

Print evaluation test
Evaluation 1: Fixation of ink

The ink composition was printed on a specialty gloss film for ink jet printing, manufactured by Seiko Epson Corp., by means of an ink jet printer MJ-700V2C (manufactured by Seiko Epson Corp.). The print was then air dried for 24 hr.

A pressure-sensitive adhesive tape (cellophane tape: Sekisui Tape, manufactured by Sekisui Chemical Co., Ltd.) was applied to the printed area in the prints after drying, rubbed twice or thrice with a finger, and then peeled off. Thereafter, the printed area from which the pressure-sensitive adhesive tape has been peeled off was visually inspected, and the results were evaluated based on the following criteria:

A: Ink (colorant) not separated from the surface of the specialty gloss film at all B: Ink (colorant) slightly separated from the surface of the specialty gloss film NG: Ink (colorant) completely separated from the surface of the specialty gloss film Evaluation 2: Ejection stability The ink composition was continuously printed at room temperature by means of an ink jet printer MJ-700V2C, during which time the prints thus formed were inspected for dropouts and scattering of the ink to determine the time taken for the dropout and ink scattering to occur ten times. The results were evaluated according to the following criteria.

AA: Neither dropouts nor ink scattering occurred ten times for not less than 72 hr.

A: Dropouts or ink scattering occurred ten times during a period between 48 hr after the initiation of the printing and 72 hr after the initiation of the printing.

B: Dropouts or ink scattering occurred ten times during a period between 24 hr after the initiation of the printing and 48 hr after the initiation of the printing.

C: Dropouts or ink scattering occurred ten times during a period between 1 hr after the initiation of the printing and 24 hr after the initiation of the printing.

NG: Dropouts or ink scattering occurred ten times within 1 hr from the initiation of the printing.

The results were as summarized in the following table.

| | Evaluation 1 | Evaluation 2 |
|---|---|---|
| Ex | A | AA |
| Comp.Ex. 1 | A | A |
| Comp.Ex. 2 | NG | NG |

Example B
Preparation of ink compositions and reaction solutions
The following ink compositions were prepared.
Black ink 1

| | |
|---|---|
| Carbon black MA7 (manufactured by Mitsubishi Chemical Corp.) | 5 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex S (colloidal silica, SiO$_2$ content 30%, manufactured by Nissan Chemical Industry Ltd.) | 2 wt % |
| Sucrose | 0.7 wt % |
| Maltitol | 6.3 wt % |
| Glycerin | 10 wt % |
| KOH | 0.1 wt % |
| Ion-exchanged water | Balance |
| pH = 10.0 | |

The carbon black and the dispersant were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, the other ingredients were added, and the mixture was stirred at room temperature for 20 min. The mixture was filtered through a 5 μm membrane filter to prepare an ink jet recording ink.

The following ink compositions were prepared as described above in connection with black ink 1.

Black ink 2

| | |
|---|---|
| Carbon black Raven 1080 (manufactured by Columbian Carbon Co., Ltd.) | 5 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex C (colloidal silica, $SiO_2$ content 20%, manufactured by Nissan Chemical Industry Ltd.) | 2 wt % |
| Sucrose | 0.7 wt % |
| Maltitol | 6.3 wt % |
| Glycerin | 10 wt % |
| Triethanolamine | 0.9 wt % |
| Ion-exchanged water | Balance |
| pH = 9.8 | |

Black ink 3

| | |
|---|---|
| Carbon black Raven 1080 (manufactured by Columbian Carbon Co., Ltd.) | 5 wt % |
| Styrene/acrylic acid copolymer (dispersant) | 1 wt % |
| Maltitol | 5 wt % |
| Glycerin | 10 wt % |
| Ion-exchanged water | Balance |
| pH = 7.7 | |

Color ink set 1
Cyan ink 1

| | |
|---|---|
| Pigment KETBLUEEX-1 (manufactured by Dainippon Ink and Chemicals, Inc.) | 2 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex S (colloidal silica, $SiO_2$ content 30%, manufactured by Nissan Chemical Industry Ltd.) | 2 wt % |
| Sucrose | 0.7 wt % |
| Maltitol | 6.3 wt % |
| Glycerin | 10 wt % |
| KOH | 0.1 wt % |
| Ion-exchanged water | Balance |
| pH = 10.3 | |

Magenta ink 1

| | |
|---|---|
| Pigment KETRED 309 (manufactured by Dainippon Ink and Chemicals, Inc.) | 2 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex S (colloidal silica, $SiO_2$ content 30%, manufactured by Nissan Chemical Industry Ltd.) | 2 wt % |
| Sucrose | 0.7 wt % |
| Maltitol | 6.3 wt % |
| Glycerin | 10 wt % |
| KOH | 0.1 wt % |
| Ion-exchanged water | Balance |
| pH = 10.3 | |

Yellow ink 1

| | |
|---|---|
| Pigment KETYELLOW 403 (manufactured by Dainippon Ink and Chemicals, Inc.) | 2 wt % |
| Styrene/acrylic acid copolymer (dispersant) | 1 wt % |
| Almatex Z116 (epoxy-containing acrylic resin emulsion, resin component 50%, manufactured by Mitsui Toatsu Chemicals, Inc.) | 3 wt % |
| Snowtex s (colloidal silica, $SiO_2$ content 30%, manufactured by Nissan Chemical Industry Ltd.) | 2 wt % |
| Sucrose | 0.7 wt % |
| Maltitol | 6.3 wt % |
| Glycerin | 10 wt % |
| KOH | 0.1 wt % |
| Ion-exchanged water | Balance |
| pH = 10.3 | |

Color ink set 2
Cyan ink 2

| | |
|---|---|
| Pigment KETBLUEEX-1 (manufactured by Dainippon Ink and Chemicals, Inc.) | 2 wt % |
| Styrene/acrylic acid copolymer (dispersant) | 1 wt % |
| Glycerin | 10 wt % |
| Ion-exchanged water | Balance |
| pH = 7.8 | |

Magenta ink 2

| | |
|---|---|
| Pigment KETRED 309 (manufactured by Dainippon Ink and Chemicals, Inc.) | 2 wt % |
| Styrene/acrylic acid copolymer (dispersant) | 1 wt % |
| Sucrose | 1 wt % |
| Glycerin | 10 wt % |
| Ion-exchanged water | Balance |
| pH = 7.5 | |

Yellow ink 2

| | |
|---|---|
| Pigment KETYELLOW 403 (manufactured by Dainippon Ink and Chemicals, Inc.) | 2 wt % |
| Styrene/acrylic acid copolymer (dispersant) | 1 wt % |
| Maltitol | 5 wt % |
| Glycerin | 10 wt % |
| Ion-exchanged water | Balance |
| pH = 7.6 | |

The following ingredients were mixed together to prepare reaction solution.

Reaction Solution 1

| | |
|---|---|
| Magnesium nitrate hexahydrate | 25 wt % |
| Triethylene glycol monobutyl ether | 10 wt % |
| Glycerin | 10 wt % |
| Ion-exchanged water | Balance |

Reaction solution 2

| | |
|---|---|
| Calcium acetate tetrahydrate | 10 wt % |
| Almatex H700 (water-soluble polyamine, manufactured by Mitsui Toatsu Chemicals, Inc.) | 3 wt % |
| Triethylene glycol monobutyl ether | 10 wt % |
| Glycerin | 10 wt % |
| Ion-exchanged water | Balance |

Reaction solution 3

| | |
|---|---|
| Magnesium nitrate hexahydrate | 25 wt % |
| C.I. Acid Blue 9 | 1 wt % |
| Triethylene glycol monobutyl ether | 10 wt % |
| Glycerin | 10 wt % |
| Ion-exchanged water | Balance |

Print evaluation tests

The following evaluation tests were carried out using the following papers. In the following tests, the ink composition and the reaction solution were used in combination as specified in tables described below. Printing was carried out using an ink jet printer MJ-700V2C (manufactured by Seiko Epson Corporation).

Papers for printing test:
(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (recycled paper, Xerox Corp.)
(6) Yamayuri Paper (recycled paper, Honshu Paper Co., Ltd.)

Evaluation 1: Print quality (feathering)

The reaction solution was first deposited (100% duty) on the recording paper, and letters were then printed using the ink composition. The prints were inspected for feathering in the letters. The results were evaluated according to the following criteria.

A: Feathering not created for all the papers
B: Feathering slightly created for some papers (recycled paper) only
C: Feathering observed for all the papers
NG: Remarkable feathering observed rendering the outline of the letter blurry Evaluation 2: Print quality (color bleeding)

The reaction solution was deposited (100% duty) on the recording paper, and color inks (cyan, magenta, and yellow) were simultaneously printed (100% duty). The prints were visually inspected for the presence of uneven color-to-color mixing in the color boundaries. The results were evaluated based on the following criteria:

A: No color-to-color mixing created with clear color boundaries for all the papers
B: Color-to-color mixing slightly created for some papers (recycled papers)
C: Color-to-color mixing created for all the papers
NG: Significant color-to-color mixing created rendering the outline of the color blurry for all the papers.

Evaluation 3: Fixation of ink

The reaction solution was first deposited (100% duty) on the recording paper, and the ink composition was then printed on a specialty gloss film for ink jet printing by means of an ink jet printer MJ-700V2C (manufactured by Seiko Epson Corp.). The print was then air dried for 24 hr.

A pressure-sensitive adhesive tape (cellophane tape: Sekisui Tape, manufactured by Sekisui Chemical Co., Ltd.) was applied to the printed area in the prints after drying, rubbed twice or thrice-with a finger, and then peeled off. Thereafter, the printed area from which the pressure-sensitive adhesive tape has been peeled off was visually inspected, and the results were evaluated based on the following criteria:

A: Ink (colorant) not separated from the surface of the specialty gloss film at all
B: Ink (colorant) slightly separated from the surface of the specialty gloss film
NG: Ink (colorant) completely separated from the surface of the specialty gloss film Evaluation 4: Ejection stability The ink composition was continuously printed at room temperature by means of an ink jet printer MJ-700V2C, during which time the prints thus formed were inspected for dropouts and scattering of the ink to determine the time taken for the dropout and ink scattering to occur ten times. The results were evaluated according to the following criteria.

AA: Neither dropouts nor ink scattering occurred ten times for not less than 72 hr.

A: Dropouts or ink scattering occurred ten times during a period between 48 hr after the initiation of the printing and 72 hr after the initiation of the printing.

B: Dropouts or ink scattering occurred ten times during a period between 24 hr after the initiation of the printing and 48 hr after the initiation of the printing.

C: Dropouts or ink scattering occurred ten times during a period between 1 hr after the initiation of the printing and 24 hr after the initiation of the printing.

NG: Dropouts or ink scattering occurred ten times within 1 hr from the initiation of the printing.

The results were as summarized in the following table.

|  | Reaction solution | Black ink | Evaluation 1 | Evaluation 3 | Evaluation 4 |
|---|---|---|---|---|---|
| Example |  |  |  |  |  |
| B1 | 1 | 1 | A | A | AA |
| B2 | 2 | 2 | A | A | A |
| B4 | 3 | 1 | A | A | AA |
| Comparative Example B1 | 1 | 3 | C | NG | NG |

|  | Reaction solution | Color ink set | Evaluation 2 |
|---|---|---|---|
| Example B3 | 1 | 1 | A |
| Comparative Example B2 | 1 | 2 | C |
| Comparative Example B3 | None | 2 | NG |

What is claimed is:

1. An ink jet recording method, comprising the step of positing a reaction solution and an ink composition onto a recording medium to perform printing, the reaction solution comprising a polyvalent metal salt, polyallylamine, or a derivative of the polyallylamine, the ink composition comprising a colorant, an inorganic oxide colloid, and an aqueous solvent and having a pH value of not less than 9.

2. The ink jet recording method according to claim 1, wherein pH of the ink composition has been adjusted by the addition of an alkali metal hydroxide.

3. The ink jet recording method according to claim 1, wherein the ink composition further comprises a saccharide.

4. The ink jet recording method according to claim 1, wherein the ink composition contains a pigment as the colorant.

5. The ink jet recording method according to claim 1, wherein the ink composition contains colloidal silica as the inorganic oxide colloid.

6. The ink jet recording method according to claim 1, wherein the ink composition has an epoxy-containing compound having a functional group reactive with an epoxy group and/or an epoxy-containing compound not having a functional group reactive with an epoxy group.

7. The ink jet recording method according to claim 6, wherein the epoxy-containing compound is an epoxy-containing resin emulsion and/or a water-soluble epoxy compound.

8. The ink jet recording method according to claim 7, wherein the epoxy-containing resin emulsion comprises a copolymer comprising repeating units represented by the following formulae (I) and (II):

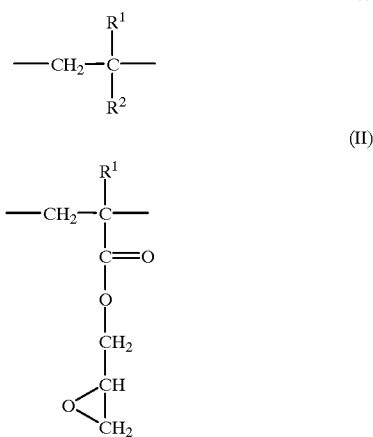

wherein $R^1$ and $R^3$ independently represent H or $CH_3$; and $R^2$ represents a group having in its structure at least one member selected from alkyl, hydroxyl, carboxyl, and sulfonic groups.

9. The ink jet recording method according to claim 7, wherein the water-soluble epoxy compound is represented by the following formula:

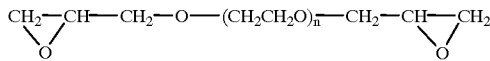

wherein n is a natural number of 4 to 9.

10. The ink jet recording method according to claim 1, wherein the ink composition comprises a resin emulsion.

11. The ink jet recording method according to claim 1, wherein the polyvalent metal salt contained in the reaction solution is a salt of nitric acid or a salt of carboxylic acid.

12. The ink jet recording method according to claim 11, wherein the carboxylate ion constituting the salt of carboxylic acid is derived from a saturated aliphatic monocarboxylic acid having 1 to 6 carbon atoms with hydrogen atom(s) on the saturated aliphatic hydrocarbon group of the monocarboxylic acid being optionally substituted by a hydroxyl group, or derived from a carbocyclic monocarboxylic acid having 6 to 10 carbon atoms.

13. The ink jet recording method according to claim 1, wherein the reaction solution further comprises an epoxy-curing agent.

14. The ink jet recording method according to claim 13, wherein the epoxy-curing agent is a water-soluble polyamine.

15. The ink jet recording method according to claim 1, wherein the reaction solution is deposited onto a recording medium followed by printing of the ink composition on the recording medium.

16. The ink jet recording method according to claim 1, wherein the ink composition is printed on a recording medium followed by deposition of the reaction solution onto the recording medium.

17. The ink jet recording method according to claim 1, wherein the reaction solution and the ink composition are mixed together immediately before or immediately after ejection from an ink jet recording apparatus followed by printing on a recording medium.

18. The ink jet recording method according to claim 1, wherein the reaction solution is a color ink containing a yellow dye, a cyan dye, or a magenta dye.

19. A recorded medium obtained by the method according to claim 1.

20. A combination comprising:
   (a) an ink composition comprising a colorant, an inorganic oxide colloid, and an aqueous solvent and having a pH value of not less than 9, and
   (b) a reaction solution comprising a polyvalent metal salt, polyallylamine, or a derivative of the polyallylamine.

21. A combination according to claim 20, wherein the ink composition further comprises a saccharide.

22. A combination according to claim 20, wherein the ink composition contains a pigment as the colorant.

23. A combination according to claim 20, wherein the ink composition contains colloidal silica as the inorganic oxide colloid.

24. A combination according to claim 20, wherein the ink composition has an epoxy-containing compound having a functional group reactive with an epoxy group or an epoxy-containing compound not having a functional group reactive with an epoxy group or both.

25. A combination according to claim 20, wherein the epoxy-containing compound is an epoxy-containing resin emulsion or a water-soluble epoxy compound or both.

* * * * *